Aug. 6, 1968
A. W. MOSS ET AL
3,395,476
ELECTRIC ILLUMINATION DEVICES
Original Filed Feb. 3, 1964
2 Sheets-Sheet 1
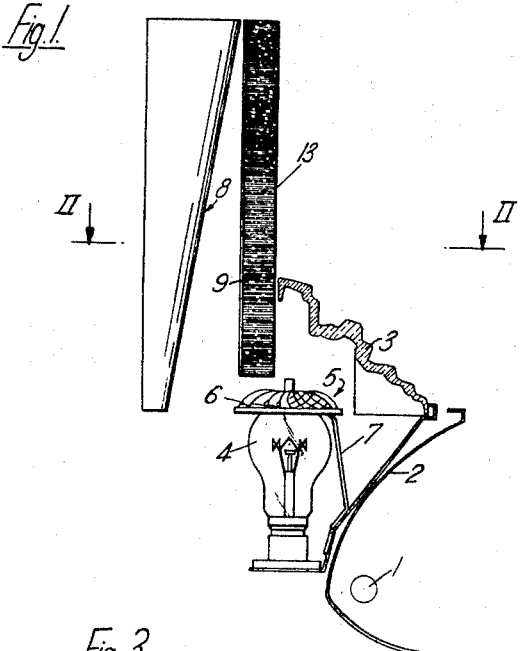
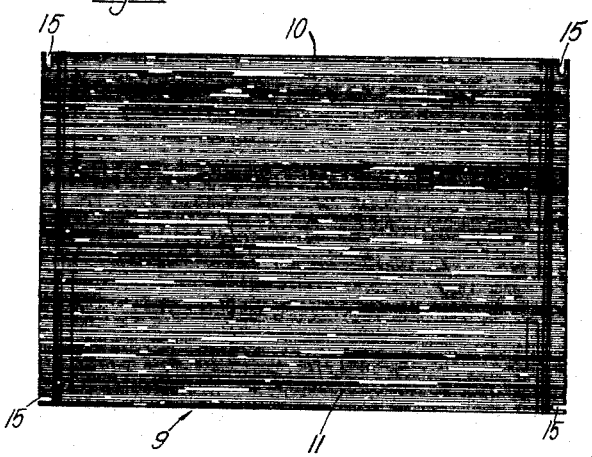
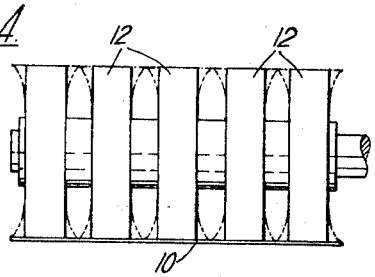
Inventors:
Arthur William Moss
Ernest Eugene Gardiner
By
Walter Becker
Patent Agent Aug. 6, 1968    A. W. MOSS ET AL    3,395,476
ELECTRIC ILLUMINATION DEVICES
Original Filed Feb. 3, 1964    2 Sheets-Sheet 2
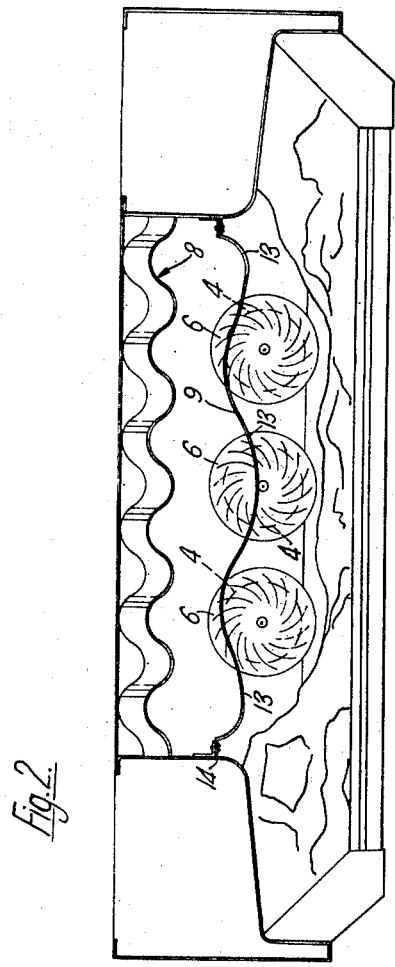
Inventor
Arthur William Moss
Ernest Eugene Gardiner
By
Patent Agent

3,395,476
ELECTRIC ILLUMINATION DEVICES

Arthur William Moss and Ernest Eugene Gardiner, Walsall, England, assignors to H. Frost & Company Limited, Walsall, England, a British company
Continuation of application Ser. No. 341,894, Feb. 3, 1964. This application Mar. 7, 1967, Ser. No. 621,364
1 Claim. (Cl. 40—106.54)

ABSTRACT OF THE DISCLOSURE

A flame simulating illumination device is composed of vertically extending reflecting surfaces illuminated by a source of flickering light, and a diffusing screen through which the reflecting surfaces are viewed. The screen has a diffusing surface formed by closely spaced, minute horizontal ribs and grooves, as by abrasions, to diffuse the transmitted light vertically and produce the effect of tongues of flame.

---

This is a continuation of application Ser. No. 341,894, filed Feb. 3, 1964, now abandoned.

This invention relates to electric illumination devices.

An object of the present invention is to provide an electric illumination device which can impart an attractive lighting effect, preferably a flame effect, when in use.

According to the invention, an electric illumination device includes, in combination with lamp means and flicker-producing means, a viewing screen through which flickering light is viewed, said viewing screen being in the form of a transparent or translucent panel having a striated light-diffusing surface formed thereon by producing on the said panel a multiplicity of closely-adjacent thin substantially horizontal lines extending across the panel. The striae in the light-diffusing surface may be formed on the panel by abrading, scratching, etching or moulding. A reflector may be disposed behind the lamp means and flicker-producing means, the viewing screen being disposed in front of the said reflector. The aforesaid transparent or translucent panel may of a plastic and the closely-adjacent lines or striae provided on the panel, so as to form the light-diffusing surface, may be produced by an abrading process wherein the panel is engaged with a set of rotating coaxial polishing mops.

In one embodiment of the invention, the electric illumination device forms part of an electric fire which is of the imitation solid-fuel type, and has a reflector disposed behind the lamp and flicker-producing means. The viewing screen, in the said embodiment may if desired be flat, but it has been found that if the screen is flat, a better visual effect is obtained if the viewer, is looking directly at the screen from the front, and if he looks at it obliquely as from one side the desired effect may not be obtained. Preferably, with a view to obviating the defect, the viewing screen in the aforesaid embodiment is not flat but has a forwardly-presented convex surface or surface portions bearing the closely-adjacent lines produced on the transparent or translucent panel.

FIGURE 1 of the accompanying drawings shows by way of example, and in diagrammatic vertical cross-section an electric fire including an electric illumination device constructed in accordance with the present invention.

FIG. 2 is a horizontal section on the line II—II of FIGURE 1.

FIGURE 3 is a front elevation of a viewing screen included in the fire shown in FIGURES 1 and 2.

FIGURE 4 diagrammatically illustrates the production of closely-spaced lines, on the screen shown in FIGURE 3, by an abrading process using rotating coaxial polishing mops.

Referring to the drawings, an electric fire of the imitation solid-fuel type has one or more bar-type heating elements such as 1 disposed in front of a trough-shaped radiant-heat reflector 2. Mounted above, and extending rearwards from, the radiant-heat reflector 2 is imitation fuel 3 simulating coal or wood logs, and disposed beneath the imitation fuel 3, and spaced rearwards of the back of the heat reflector 2, are red or orange coloured electric lamps 4 each associated, in known manner, with a flicker-producing device 5 consisting of an apertured spinner 6 pivotally mounted on a bracket 7. When the lamps are switched on, the hot air therefrom causes the respective spinners 6 to rotate. Red or orange flickering light from the lamp and flicker device combinations is reflected forwards, so as to be directed forwards above the imitation fuel, by a light-reflector 8 disposed at the rear of the lamps and flicker devices; and spaced in front of the said light-reflector 8, so as to lie in the path of the red or orange flickering light reflected from the latter, is a viewing screen 9 in the form of a translucent or transparent panel 10 made of a plastic (for example a polyvinyl chloride plastic) and having a striated, light-diffusing surface formed thereon by abrading on the panel a multiplicity of closely-adjacent thin horizontal, or near-horizontal, broken or unbroken transverse lines or striae 11, the said lines 11 extending from one side to the other of the panel 10. The said lines 11 are indicated only diagrammatically on FIGURE 3, their density, in the embodiment now being described being of the order of from 2,000 to 2,500 lines per inch. These lines 11 are, in the case of this embodiment, produced on the sheet 10 by an abrading process wherein the sheet 10 is passed more or less tangentially with respect to, and in contact with, a set of rotating coaxial linen polishing-mops 12 (FIGURE 4), using a suitable polishing compound, for example that sold under the trademark "Sateen." The axial spacing of these mops 12 is such that, when rotating at a predetermined working speed, the peripheries of the mops splay out in contact with the panel 10 to such an extent that the panel zone polished by each mop is contiguous to the zone or zones polished by the adjacent mop or mops, whereby the spaced lines 11 cover the whole area of the panel 10.

The viewing screen 9, consisting of the panel 10 provided with the lines 11, is of corrugated form in horizontal cross-section (FIG. 2), whereby the line-bearing light-diffusing surface of the screen 9 has a plurality of forwardly-presented parallel convex portions 13. The viewing screen 9 is conveniently secured at its edges to a casing 14 of the fire by screws (not shown) engaged with slots 15 in the panel 10.

The above-described arrangement, wherein the viewing screen 9, having the lines 11 thereon, is disposed in the path of the red or orange flickering light reflected from the reflector 8, results in the simulated appearance, to the viewer, of long upwardly-shooting flames.

If desired, the viewing screen may, instead of being vertically corrugated, be of a vertical trough form having a forwardly-presented line-bearing light-diffusing single convex surface extending from one side of the screen to the other.

The line-bearing viewing screen may if desired be flat, or have a forwardly-presented single concave surface bearing the lines, although as hereinbefore indicated, a screen having a forwardly-presented convex surface or surface portions, bearing the lines, is preferred.

The panel of the viewing screen may be of any other suitable plastic, for example, polyvinyl chloride or if required it may be of glass. The lines or striae on the said panel may be formed thereon by any suitable method of abrading, scratching, etching, or moulding. They may, for example, be formed on the panel by means of a scratch brush. Or, for example, the said lines may be produced by etching with a suitable acid or other corrosive fluid. The lines may be wavy in form, if required.

The light-reflector can advantageously be sprayed with a suitable lacquer to give the flame effect a more realistic appearance.

Instead of three lamps and flicker-producing devices, any other suitable number of lamps and flicker-producing devices, or a single lamp and flicker-producing device, may be provided, according to requirements.

Electric illumination devices constructed in accordance with the invention can be included in heaters other than electric fires of the imitation solid-fuel type, if desired. For example, the viewing screen can be provided, in combination with lights and flicker-producing means and a reflector for reflecting the flickering light forwards on to the viewing screen, in an electric convector heater having a front window through which the lighting effect can be viewed.

Or, the illumination device can be included in a gas-fired heater, the said device being suitably disposed to prevent its becoming damaged by heat from the burners.

If desired the light-reflector can be omitted and the viewing screen arranged to receive light directly from the lamp and flicker-producing means, but in those applications of the invention where the light-reflector is omitted, the lighting effect obtained may not be a flame effect. It is therefore considered to be more suitable, in the case where the invention is to be applied to an imitation solid-fuel electric fire, to include a light reflector.

If desired, an electric illumination device constructed in accordance with the invention can be built as an electric display device, for use on its own, which is not included in an electric or other heater.

We claim:

1. A flame simulating electric illumination device comprising a stationary viewing screen of translucent material having a light diffusing surface, a source of flickering light below said screen directing light upwardly behind said screen, light reflecting means spaced rearwards of said screen and having vertically extending elongated reflecting surfaces which are illuminated by said light in the rear of said screen, said illuminated reflecting surfaces being viewable through said screen from in front of said screen, and said light diffusing surface being a densely horizontally striated surface consisting of minute closely spaced grooves formed by horizontal abrasions over substantially the entire surface to diffuse said light vertically so that said flickering streaks of light simulate tongues of flame when viewed through said screen.

References Cited
UNITED STATES PATENTS

| | | | |
|---|---|---|---|
| 1,867,199 | 7/1932 | Wildhaber | 350—125 |
| 1,983,626 | 12/1934 | Lytle | 350—127 |
| 1,992,540 | 2/1935 | Newton | 40—106.54 |
| 2,256,692 | 9/1941 | Stableford | 350—129 |
| 2,551,954 | 5/1951 | Lehman | 350—259 X |

FOREIGN PATENTS

| | | |
|---|---|---|
| 257,888 | 11/1926 | Great Britain. |
| 413,293 | 7/1934 | Great Britain. |

EUGENE R. CAPOZIO, *Primary Examiner.*

R. CARTER, *Assistant Examiner.*